United States Patent
Huang et al.

(10) Patent No.: US 9,423,837 B2
(45) Date of Patent: Aug. 23, 2016

(54) PORTABLE ELECTRONIC APPARATUS

(71) Applicant: Acer Inc., New Taipei (TW)

(72) Inventors: Yi-Ta Huang, New Taipei (TW);
Wen-Chieh Tai, New Taipei (TW);
Cheng-Nan Ling, New Taipei (TW);
Hsien-Wei Chen, New Taipei (TW)

(73) Assignee: Acer Inc., New Taipei (TW)

( * ) Notice: Subject to any disclaimer, the term of this patent is extended or adjusted under 35 U.S.C. 154(b) by 334 days.

(21) Appl. No.: 14/257,029

(22) Filed: Apr. 21, 2014

(65) Prior Publication Data
US 2015/0124400 A1 May 7, 2015

(30) Foreign Application Priority Data

Nov. 6, 2013 (TW) .............................. 102140301 A

(51) Int. Cl.
*G06F 1/16* (2006.01)

(52) U.S. Cl.
CPC ........... *G06F 1/1681* (2013.01); *G06F 1/1616* (2013.01); *G06F 1/1622* (2013.01)

(58) Field of Classification Search
CPC .. G06F 1/1681; G06F 1/1616; G06F 1/1622; G06F 1/1624; G06F 1/1633; G06F 1/1666; G06F 1/1669; G06F 1/1671; G06F 1/1679
USPC ............ 361/679.26–679.29, 679.55; 16/221, 16/230, 231, 233, 282, 287, 302
See application file for complete search history.

(56) References Cited

U.S. PATENT DOCUMENTS

| | | | |
|---|---|---|---|
| 7,532,459 B2* | 5/2009 | Son ..................... | H04M 1/0212 16/367 |
| 8,925,152 B2* | 1/2015 | Ejima ................. | H04M 1/0216 16/287 |
| 2006/0005353 A1* | 1/2006 | Kubota ............... | H04M 1/0216 16/221 |
| 2006/0037175 A1* | 2/2006 | Hyun .................. | H04M 1/0222 16/221 |
| 2007/0104467 A1* | 5/2007 | Wang ..................... | G06F 1/162 386/362 |
| 2007/0291445 A1* | 12/2007 | Chen ..................... | F16M 11/00 361/679.27 |
| 2009/0038115 A1* | 2/2009 | Wu ............................ | E05D 3/10 16/221 |
| 2012/0222268 A1* | 9/2012 | Yamaguchi ......... | H04M 1/0237 16/302 |
| 2013/0322011 A1* | 12/2013 | Yeh ........................ | G06F 1/181 361/679.44 |
| 2014/0007380 A1* | 1/2014 | Shih ..................... | G06F 1/1681 16/341 |
| 2014/0218855 A1* | 8/2014 | Fujino ................... | G06F 1/1654 361/679.12 |
| 2014/0376168 A1* | 12/2014 | Yang .................... | G06F 1/1681 361/679.27 |
| 2014/0376180 A1* | 12/2014 | Chen .................... | G06F 1/1681 361/679.55 |
| 2015/0013107 A1* | 1/2015 | Shin ........................ | E05D 3/06 16/366 |

* cited by examiner

*Primary Examiner* — Zachary M Pape
*Assistant Examiner* — Douglas Burtner
(74) *Attorney, Agent, or Firm* — Alan D. Kamrath; Kamrath IP Lawfirm, P.A.

(57) ABSTRACT

A portable electronic apparatus includes a base, two linkage assemblies disposed on two sides of the base, and a first component and a second component pivoted respectively on the base. Each linkage assembly includes a lever and a dual axis rotating module combined between a first end and a second end of the lever, and each dual axis rotating module disposes on the side of the base. The lever rotates along the side of the base and along a first plane being substantially perpendicular to the side relative to the base by the dual axis rotating module. During the first component rotates relative to the base from an open state to a close state, the first end of each lever is pushed to rotate along the first plane, and the second component is clipped by the second end of each lever.

10 Claims, 10 Drawing Sheets

PORTABLE ELECTRONIC APPARATUS

BACKGROUND OF THE INVENTION

1. Field of the Invention

The present invention relates to a portable electronic apparatus; more particularly, the present invention relates to a portable electronic apparatus capable of reducing structural interference or partial friction occurred among different components.

2. Description of the Related Art

Generally, a portable electronic apparatus having a clamshell or similar design is mainly assembled by two mutually pivoted components. Take a laptop computer as an example; it is designed by pivoting, via pivoting elements, a display end having a display screen to a host end, such that the display end can rotate relative to the host end, so as to switch between an open state and a close state.

Conventional laptop computers mostly have their pivoting elements protruded from the surface of the host end for the convenience of correspondingly pivoting to the display end. In order to follow different design standards, some laptop computers are provided with improved pivoting elements of the display end and the host end; such as adjusting pivoting positions to be lower than the surface of the host end, so as to reduce the overall thickness of the laptop computer or to improve the streamline shape of its overall appearance. However, for this kind of design improvement, if the pivoting elements between the two members are not properly designed, during the process of turning the laptop computer into the close state by rotating the display end toward the host end, it is very likely that the display end would rub against the host end thereby causing partial friction to the overall appearance; which would influence the smoothness of rotating the display end toward the host end, or, even worse, would cause damage to the display end and the host end, and thus resulting in bad user experience.

Therefore, there is a need to provide a portable electronic apparatus capable of reducing structural interference or partial friction caused by relative rotation among different components to mitigate and/or obviate the aforementioned problems.

SUMMARY OF THE INVENTION

It is an object of the present invention to provide a portable electronic apparatus capable of reducing structural interference or partial friction occurred among different components.

To achieve the abovementioned objects, the portable electronic apparatus of the present invention comprises a base, a first component, a second component and two linkage assemblies. The first component is pivoted to the base via two first pivoting modules, wherein each of the first pivoting modules includes a driving member. The second component is pivoted to the base. The two linkage assemblies are respectively disposed on two sides of the base, and each of the linkage assemblies includes a lever and a dual axis rotating module, wherein the lever includes a first end and a second end. The dual axis rotating module is combined between the first end and the second end of the lever, and the dual axis rotating module is mounted to the side of the base, such that the lever uses the dual axis rotating module as a pivot to rotate along the side of the base and along a first plane being substantially perpendicular to the side relative to the base, and the first end is located corresponding to the driving member.

During the process of rotating the first component relative to the base from an open state to a close state, the driving member of each of the first pivoting modules pushes against the first end of each of the levers, such that each of the levers rotates along the first plane and the second component is clipped by the second end; and each of the driving members drives each of the levers to rotate along the side, such that the second component moves toward a bottom of the base to generate displacement.

According to the abovementioned design, when the second component of the portable electronic apparatus of the present invention rotates towards to the base to close, the first component would be driven by the rotation of the second component so as to leave its original position and move toward a bottom of the base to generate rotation displacement. Therefore, the displaced first component can avoid causing structural interference or friction to the second component to prevent damages to both components, so as to keep the smoothness and stability of the second component rotating relative to the base.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
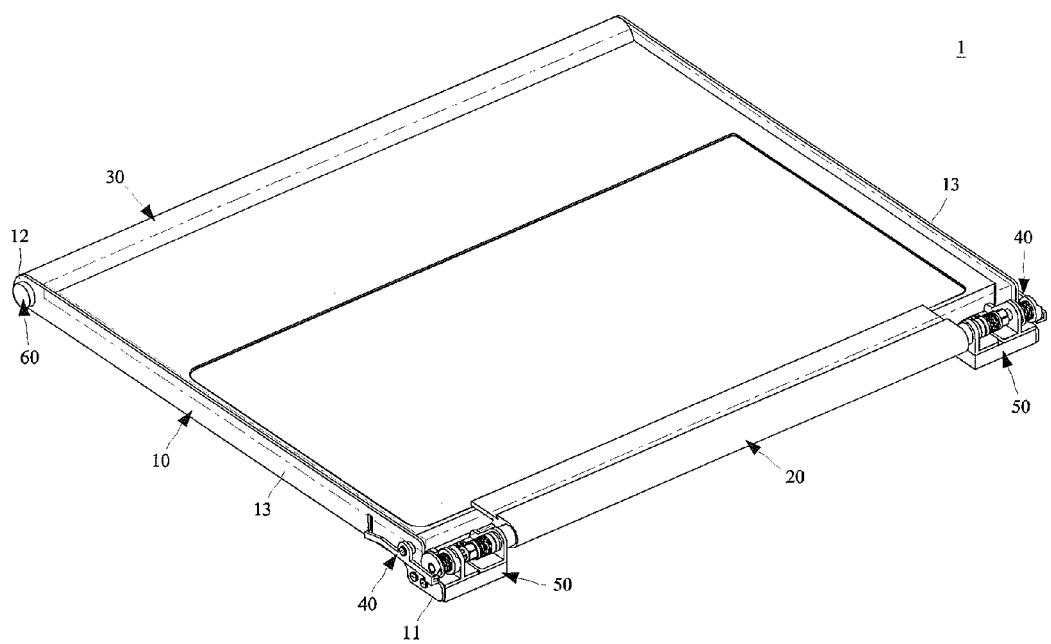
FIG. 1 illustrates an overall schematic drawing of a portable electronic apparatus according to a first embodiment of the present invention.
Figure 2:
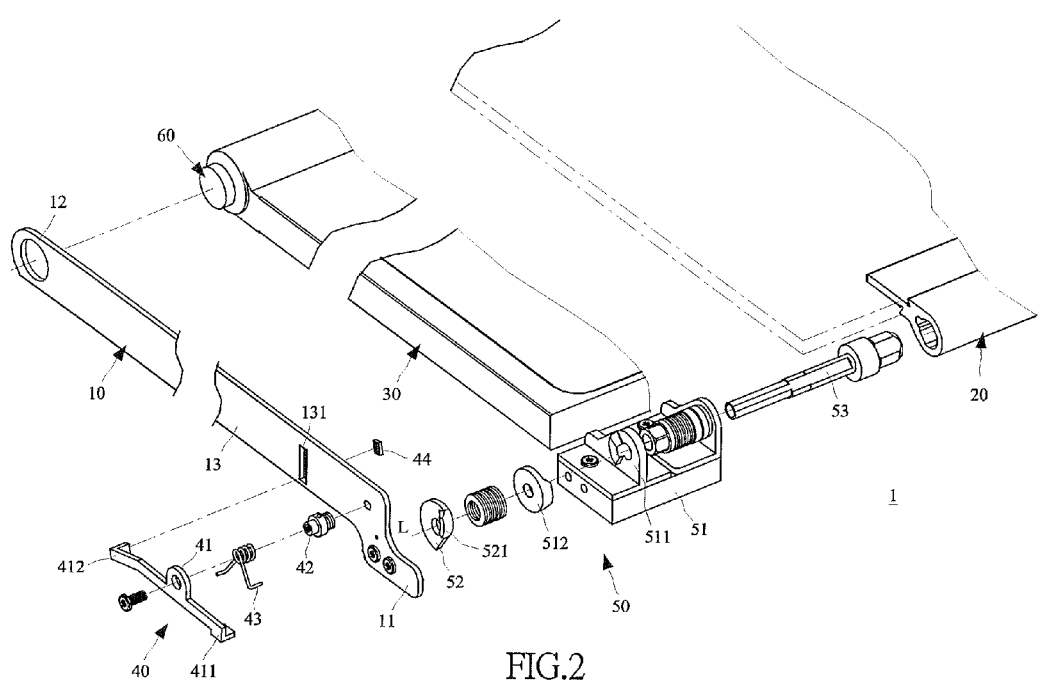
FIG. 2 illustrates an exploded view showing partial structure of the portable electronic apparatus according to the first embodiment of the present invention.

Please refer to both FIG. 1 and FIG. 2. FIG. 1 illustrates an overall schematic drawing of a portable electronic apparatus according to the present invention; FIG. 2 illustrates an exploded view showing partial structure of the portable electronic apparatus according to the present invention. In one embodiment of the present invention, the portable electronic apparatus 1 can be a laptop computer, or a combination of a tablet PC and its extension base. However, the scope of the present invention is not limited to the above description; the present invention can also be applied in other portable electronic apparatus having a similar clamshell structure design. In the following embodiments, the portable electronic apparatus 1 of the present invention is a laptop computer as a non-limiting example.

As shown in FIG. 1 and FIG. 2, the portable electronic apparatus 1 of the present invention comprises a base 10, a first component 20, a second component 30, two linkage assemblies 40, two first pivoting modules 50 and two second pivoting modules 60. The base 10 comprises two sides 13, and a front end 11 and a rear end 12 opposite to each other. The first component 20 is pivoted to the front end 11 of the base 10 via the two first pivoting modules 50, and the second component 30 is pivoted to the rear end 12 of the base 10 via the two second pivoting modules 60, such that the first component 20 and the second component 30 can respectively rotate relative to the base 10. In one embodiment of the present invention, the base 10 can be a device base or a main frame structure, the first component 20 is a display module, and the second component 30 is a keyboard module; however please note the scope of the present invention is not limited to the above description.

The two linkage assemblies 40 are symmetrically disposed on the two sides 13 of the base 10, such that each side 13 is correspondingly installed with a linkage assembly 40. Each of the linkage assemblies 40 includes a lever 41 and a dual axis rotating module 42. The lever 41 includes a first end 411 and a second end 412. The dual axis rotating module 42 is combined between the first end 411 and the second end 412 of the lever 41, and the dual axis rotating module 42 is mounted to the side 13 of the base 10. The dual axis rotating module 42 is a rotating module capable of respectively rotating around two rotating shafts being substantially perpendicular to each other. Accordingly, the lever 41 can use the dual axis rotating module 42 as a pivot, so as to rotate along different planes relative to the base 10 and therefore generate rotation displacement.

Each of the linkage assemblies 40 further comprises an elastic element 43, so as to provide a restoring function by means of its elastic restoring force after the lever 41 rotates relative to the base 10. The elastic element 43 is combined with the dual axis rotating module 42 for responding to the rotation operation of the dual axis rotating module 42. Furthermore, each of the linkage assemblies 40 further comprises a damping element 44. The damping element 44 is disposed to the second end 412 of the lever 41, such that the damping element 44 provides clipping effect to the second component 30.

The two first pivoting modules 50 are respectively disposed on two sides of the base 10. Each of the first pivoting modules 50 comprises a primary pivoting member 51, a driving member 52 and a rotating shaft member 53. The primary pivoting member 51 is pivoted to the first component 20 via the rotating shaft member 53. One end of the primary pivoting member 51 is mounted to the base 10. The primary pivoting member 51 can comprise a first cam 511 and a second cam 512 corresponding to the same pivot shaft L (i.e. the pivot point of the rotating shaft member 53). When the first component 20 rotates to a specific angle (such as greater than 90 degrees) relative to the base 10, the structure design of oppositely arranging the two cams can provide positioning effect which keeps the first component 20 at the specific angle. Because the related arrangement of the two cams as described above is a common positioning function design for pivoting elements, there is no need for further description.

The driving member 52 comprises a protrusion 521, and the driving member 52 also corresponds to the same pivot shaft L, such that during the process of rotating the first component 20 relative to the base 10, the driving member 52 and its protrusion 521 would rotate accordingly. The driving member 52 is disposed corresponding to the first end 411 of the lever 41 of the linkage assembly 40, so as to achieve the object of driving the lever 41 via the rotation of the driving member 52 while reaching within a specific rotation angle. The driving member 52 itself is also designed as a cam structure, wherein the protrusion 521 is disposed to the cam structure at one side that faces the first end 411 of the lever 41.

In this embodiment, the protrusion 521 is designed as a curved-shaped bump, such that the protrusion 521 extends inwardly from the outer periphery of the driving member 52 to approximately the center. Therefore, when the driving member 52 rotates, it not only can drive the lever 41 to rotate, but also can change the portion where the protrusion 521 touches the first end 411 of the lever 41 according to the change of the rotation angle of the driving member 52; however, please note the scope of the present invention is not limited to the above description.

Figure 3:
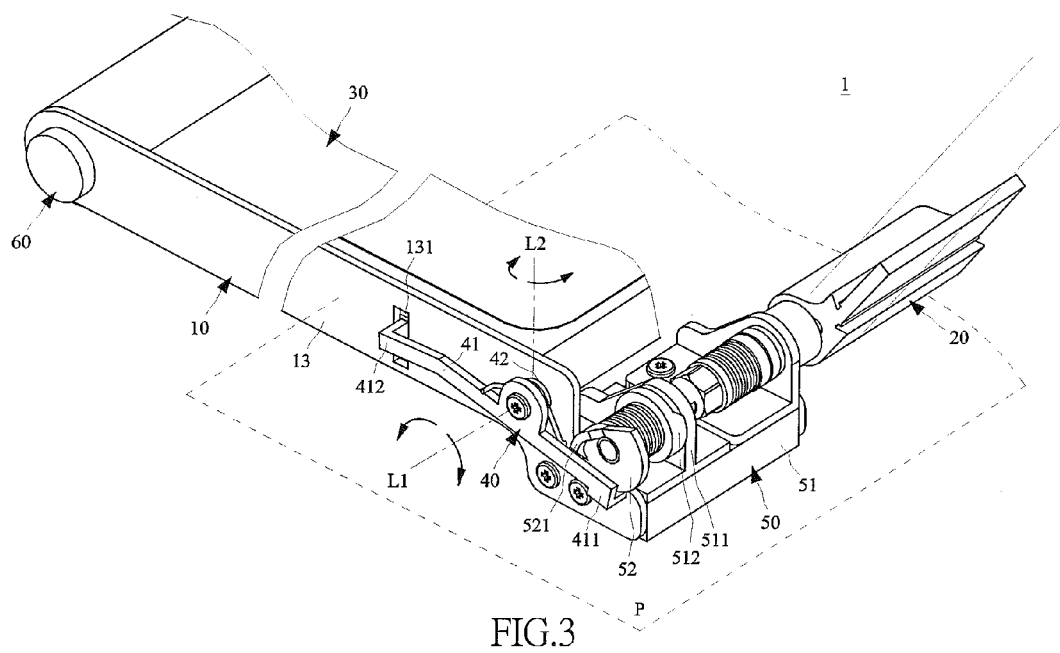
FIG. 3 illustrates a schematic drawing showing a first component of the portable electronic apparatus in an open state according to the first embodiment of the present invention.
Figure 4A:
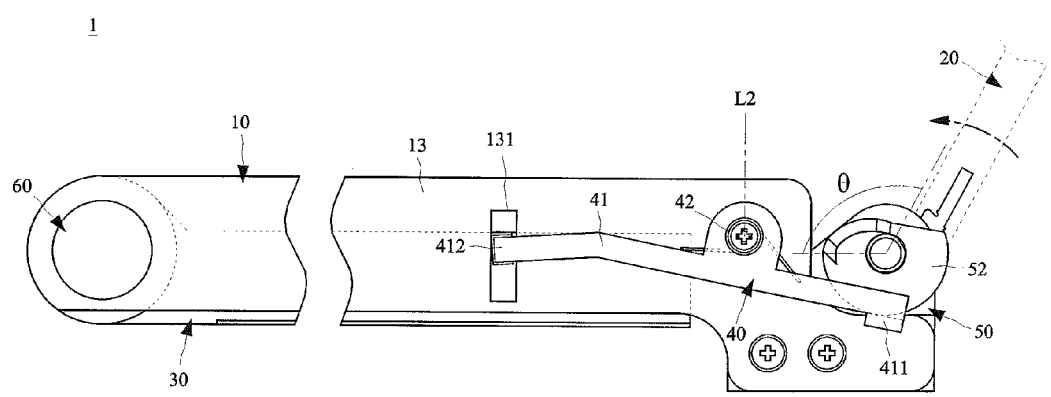
FIG. 4(a) illustrates a side view showing the first component of the portable electronic apparatus in the open state according to the first embodiment of the present invention.
Figure 4B:
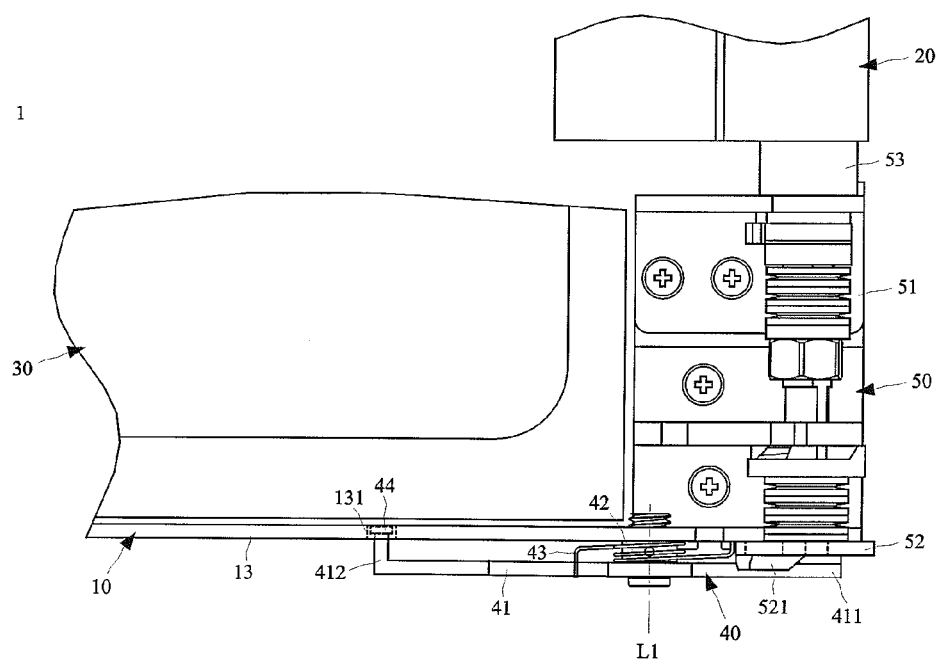
FIG. 4(b) illustrates a top view showing the first component of the portable electronic apparatus in the open state according to the first embodiment of the present invention.

Please refer to FIG. 3 to FIG. 4(b). FIG. 3 illustrates a schematic drawing showing the first component 20 of the portable electronic apparatus 1 in an open state according to the present invention; FIG. 4(a) illustrates a side view showing the first component 20 of the portable electronic apparatus 1 in the open state according to the present invention; FIG. 4(b) illustrates a top view showing the first component 20 of the portable electronic apparatus 1 in the open state according to the present invention.

As shown in FIG. 3, the lever 41 of the linkage assembly 40 can use the dual axis rotating module 42 as a pivot, so as to rotate along the side 13 relative to the base 10 by using a first shaft L1 as the rotating shaft which is substantially perpendicularly to the side 13 of the base 10; and to rotate along a first plane P relative to the base 10 by using a second shaft L2 as the rotating shaft which is substantially perpendicular to the first plane P, respectively. The first plane P is a plane which is substantially perpendicular to the side 13 and passes through the dual axis rotating module 42.

As shown in FIG. 3 and FIG. 4(a), when the portable electronic apparatus 1 of the present invention is in an open state, an included angle is formed between the first component 20 and the base 10. At this time, the included angleθ is at an appropriate angle which allows a user to perform corresponding input operations to the first component 20 and/or the second component 30, and to view image data displayed by the first component 20. For example, the included angleθ is between 70 degrees and 180 degrees. More particularly, the preferable appropriate angle is between 90 degrees and 120 degrees without limiting the scope of the present invention.

Further, as shown in FIG. 4(a) and FIG. 4(b), when the first component 20 rotates within the abovementioned angle range relative to the base 10, the protrusion 521 of the driving member 52 does not contact the lever 41 of the linkage assembly 40 yet. That is, under such state, the driving member 52 does not generate any corresponding connecting operations to the lever 41, such that the lever 41 could remain in its original position.

Figure 5A:
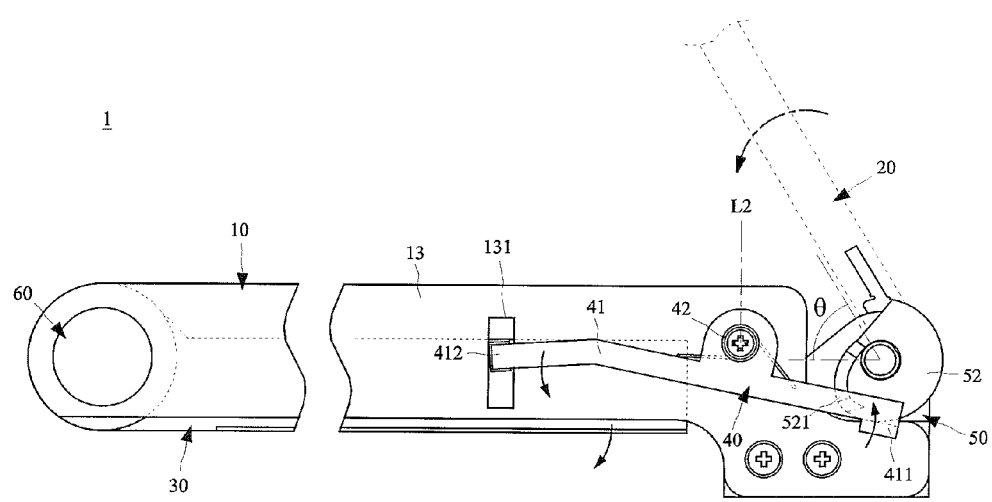
FIG. 5(a) illustrates a side view showing the process of rotating the first component of the portable electronic apparatus from the open state to a close state with an included angle between the first component and the second component less than a first angle according to the first embodiment of the present invention.
Figure 5B:
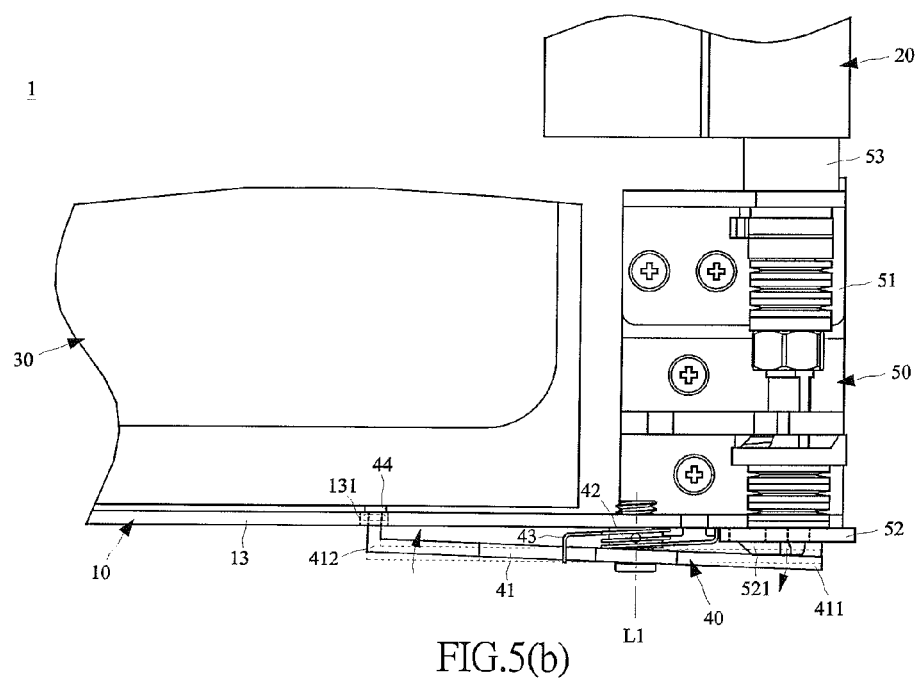
FIG. 5(b) illustrates a top view showing the process of rotating the first component of the portable electronic apparatus from the open state to the close state with the included angle between the first component and the second component less than the first angle according to the first embodiment of the present invention.

Please refer to both FIG. 5(a) and FIG. 5(b). FIG. 5(a) illustrates a side view showing the process of rotating the first component 20 of the portable electronic apparatus 1 from the open state to a close state with the included angle θ between the first component 20 and the second component 30 less than a first angle according to the present invention; FIG. 5(b) illustrates a top view showing the process of rotating the first component 20 of the portable electronic apparatus 1 from the open state to the close state with the included angleθ between the first component 20 and the second component 30 less than the first angle according to the present invention. As shown in FIG. 5(a) and FIG. 5(b), when the user wants to rotate the first component 20 of the portable electronic apparatus 1 of the present invention from the open state to a close state, the user needs to use the first pivoting module 50 as a pivot to rotate the first component 20 from the open state as shown in FIG. 5(a) toward the base along the arrow direction as shown in FIG. 5(a), such that the first component 20 can finally be lapped over the base 10 and the second component 30, so as to reach the close state.

During the process of rotating the first component 20 relative to the base 10, because the rotating shaft member 53 of the first pivoting module 50 is connected to the first component 20, the rotation of the first component 20 would drive the driving member 52 to rotate, and thus change the position of the protrusion 521 of the driving member 52 with respect to the first end 411 of the lever 41. When the first component 20 rotates relative to the base 10 to make the included angleθ formed between the first component 20 and the base 10 at a first angle, the protrusion 521 (near the outer periphery of the driving member 52) of the driving member 52 starts to touch the first end 411 of the lever 41, and pushes against the first end 411 along the arrow direction as shown in FIG. 5(b) (i.e. the direction which is substantially perpendicular to the side 13 of the base 10 and away from the base 10). In one embodiment of the present invention, the first angle corresponding to the included angleθ is between 60 degrees and 80 degrees; more particularly, the preferable first angle is about 70 degree without limiting the scope of the present invention.

The pushed lever 41 would rotate by using the second shaft L2 as the rotating shaft, such that the second end 412 of the lever 41 would move along a direction approaching the side 13 of the base 10, and pass though a punch hole 131 of the side 13 until the second end 412 touches and clips the second component 30. The position where the second component 30 is clipped is away from one end where the second component 30 is pivoted to the second pivoting module 60. The moving distance of pushing the first end 411 of the lever 41 is no less than the distance between the second end 412 of the lever 41 and the second component 30. Therefore, after the first end 411 of the lever 41 is pushed by the protrusion 521 of the driving member 52, the second end 412 of the lever 41 can tightly push against the second component 30.

Because the second end 412 of the lever 41 of the linkage assembly 40 is installed with a damping element 44, more friction resistance would be generated by the damping element 44 when the second end 412 touches the second component 30, so as to help the second end 412 to more tightly push against the second component 30. In the present invention, the two symmetrical sides 13 of the base 10 are both disposed with the linkage assemblies 40, such that when the included angle θ between the first component 20 and the base 10 is less than the first angle during the rotation of the first component 20, the levers 41 of the linkage assemblies 40 disposed on the two sides 13 of the base 10 would directly and respectively clip the second component 30.

Figure 6:
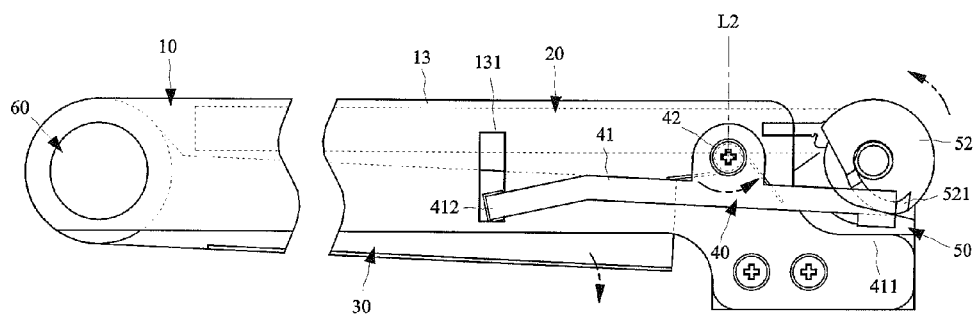
FIG. 6 illustrates a side view showing the first component of the portable electronic apparatus rotating to the close state according to the present invention.

Please refer to FIG. 5(a) to FIG. 6. FIG. 6 illustrates a side view showing the first component 20 of the portable electronic apparatus 1 rotating to the close state according to the present invention. When the first component 20 keeps rotating toward the base 10 under the state of FIG. 5(a) to make the included angleθ formed between the first component 20 and the base 10 less than the first angle, the protrusion 521 of the driving member 52 keeps pushing against the first end 411 of the lever 41, such that the first end 411 of the lever 41 would rotate with the driving member 52 along the side 13 by using the first shaft L1 as the rotating shaft, and the second end 412 of the lever 41 would move toward a bottom of the base 10. At this time, the rotation direction of the first component 20 is the same as the direction of rotating the lever 41 along the side 13. Furthermore, the protrusion 521 of the driving member 52 is designed with sufficient length, such that the driving member 52 can keep touching and pushing against the first end 411 of the lever 41 within a specific rotation angle of the first component 20. In this embodiment, the protrusion 521 of the driving member 52 can keep touching and pushing against the first end 411 of the lever 41 within the first angle and 0 degree of the first component 20; however, please note the scope of the present invention is not limited to the above embodiment.

Because the second component 30 is clipped by the second ends 412 of the levers 41 on both sides, the second component 30 would also be driven by the rotating linkage assemblies 40, so as to rotate relative to the base 10 by using the second pivoting module 60 as a pivot, such that one end of the second component 30 that is away from the second pivoting module 60 would move toward the bottom of the base 10. When the first component 20 finally rotates to reach the close state, it is shown as FIG. 6.

As a result, during the process of rotating the first component 20 relative to the base 10 from the open state to the close state, according to the connecting operations among the first pivoting module 50 and the two linkage assemblies 40, one end of the second component 30 that is away from the second pivoting module 60 would be driven to move toward the bottom of the base 10, so as to prevent the second component 30 from causing interference or friction to the first component 20 during the rotation operation of the first component 20.

Figure 7A:
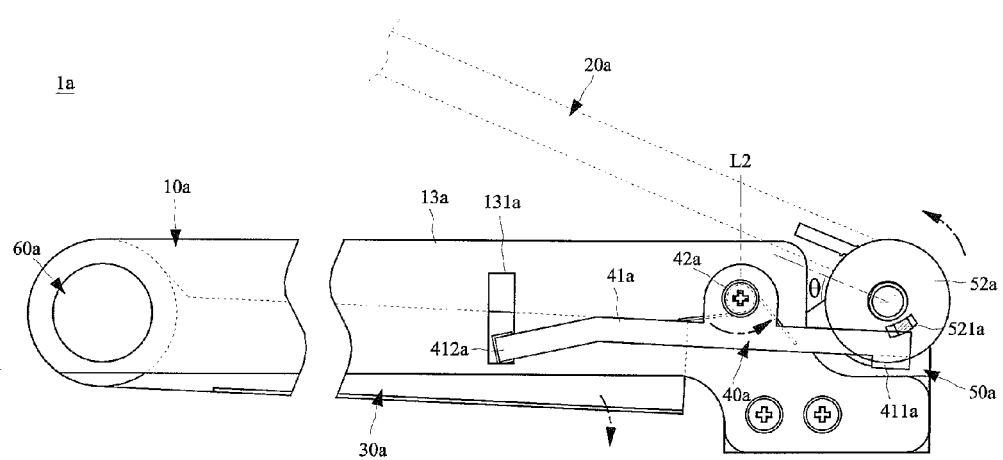
FIG. 7(a) illustrates a side view showing the process of rotating the first component of the portable electronic apparatus from the open state to the close state with the included angle between the first component and the second component equal to a second angle according to a second embodiment of the present invention.
Figure 7B:
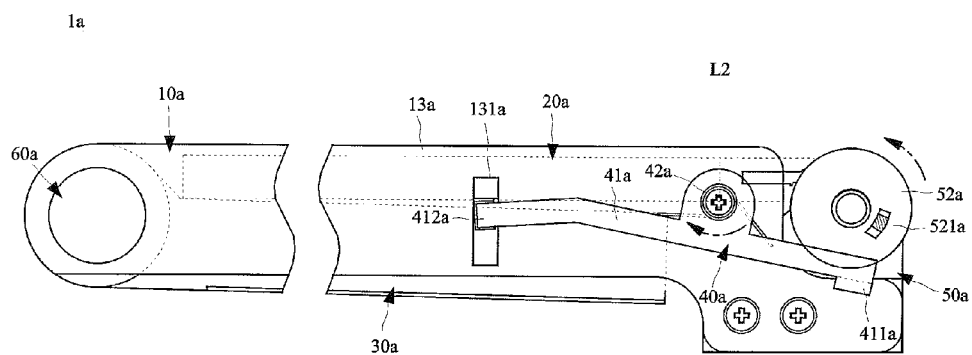
FIG. 7(b) illustrates a top view showing the first component of the portable electronic apparatus rotating to the close state according to the second embodiment of the present invention.

Please refer to both FIG. 7(a) and FIG. 7(b). FIG. 7(a) illustrates a side view showing the process of rotating the first component 20a of the portable electronic apparatus 1a from the open state to the close state with the included angle θ between the first component 20a and the second component 30a equal to a second angle according to a second embodiment of the present invention; FIG. 7(b) illustrates a side view showing the first component 20a of the portable electronic apparatus 1a rotating to the close state according to the second embodiment of the present invention.

This second embodiment is a variation of the abovementioned first embodiment. As shown in FIG. 7(a), in this embodiment, the rotation angle of the protrusion 521a of the driving member 52a touching and pushing against the first end 411a of the lever 41a is reduced by means of changing the design of the driving member 52a of the second pivoting module 50a.

Similar to the abovementioned first embodiment, when the included angle θ formed between the first component 20a and the base 10a is less than the first angle, the protrusion 521a of the driving member 52a would keep touching and pushing against the first end 411a of the lever 41a. However, when the first component 20a keeps rotating toward the base 10a to make the included angle θ formed between the first component 20a and the base 10a at a second angle, the protrusion 521a of the driving member 52a would gradually stop pushing against the first end 411a of the lever 41a according to the rotation displacement. Once the first end 411a of the lever 41a is not pushed by the external force anymore, the lever 41a can be restored to its original position via the elastic element 43a, and therefore the second component 30a is no longer clipped by the second end 412a of the lever 41a as shown in FIG. 7(b). In one embodiment of the present invention, the second angle corresponding to the included angleθ is greater than 0 degree and less than the first degree; more particularly, the preferable second angle is between about 0 degree to 20 degree without limiting the scope of the present invention.

Meanwhile, although the second component 30a is not clipped by the lever 41a, the second component 30a would still be blocked by the first component 20a near the base 10a or under the close state, so as to keep moving toward the bottom of the base 10a. The second component 30a would no longer be pressed by external force until the first component 20a rotates inversely from the close state to a specific angle, and therefore would restore to its original position via another elastic element installed in the second pivoting module 60a.

Although the present invention has been explained in relation to its preferred embodiments, it is to be understood that many other possible modifications and variations can be made without departing from the spirit and scope of the invention as hereinafter claimed.

What is claimed is:

1. A portable electronic apparatus, comprising:
a base, comprising two opposite sides;
a first component, pivoted to the base via two first pivoting modules, wherein each of the first pivoting modules includes a driving member;
a second component, pivoted to the base; and
two linkage assemblies, respectively disposed on the two sides of the base, each of the linkage assemblies including a lever and a dual axis rotating module, wherein the lever includes a first end and a second end, the dual axis rotating module is combined between the first end and the second end of the lever, and the dual axis rotating module is mounted to the side of the base, such that the lever uses the dual axis rotating module as a pivot to rotate along the side of the base and along a first plane being substantially perpendicular to the side relative to the base, and the first end is located corresponding to the driving member;
wherein during the process of rotating the first component relative to the base from an open state to a close state, the driving member of each of the first pivoting modules pushes against the first end of each of the levers, such that each of the levers rotates along the first plane and the second component is clipped by the second end, and each of the driving members drives each of the levers to rotate along the side, such that the second component moves toward a bottom of the base to generate displacement.

2. The portable electronic apparatus as claimed in claim 1, wherein the driving member is a cam structure.

3. The portable electronic apparatus as claimed in claim 2, wherein the driving member includes a protrusion, and the protrusion is disposed to the cam structure at one side that faces the first end of the lever.

4. The portable electronic apparatus as claimed in claim 1, wherein during the process of rotating the first component relative to the base from the open state to the close state, when an included angle formed between the first component and the base is at a first angle, each of the driving members starts to push against the first end of each of the levers, such that the second component is clipped by the second end of each of the levers.

5. The portable electronic apparatus as claimed in claim 4, wherein during the process of rotating the first component relative to the base from the open state to the close state, when the included angle formed between the first component and the base is less than a second angle, each of the driving members stops pushing against the first end of each of the levers, such that the second component is no longer clipped by the second end of each of the levers; and the second angle is less than the first angle.

6. The portable electronic apparatus as claimed in claim 1, wherein each of the linkage assemblies further includes a damping element disposed to the second end of the lever, such that the damping element provides clipping effect to the second component.

7. The portable electronic apparatus as claimed in claim 1, wherein the first component is a display module, and the second component is a keyboard module.

8. The portable electronic apparatus as claimed in claim 1, wherein the base comprises a front end and a rear end opposite to each other, the first component is pivoted to the rear end, and the second component is pivoted to the front end.

9. The portable electronic apparatus as claimed in claim 1, wherein each of the linkage assemblies further comprises an elastic element used for providing a restoring function after the lever rotates relative to the base.

10. The portable electronic apparatus as claimed in claim 1, wherein during the process or rotating the first component relative to the base from the open state to the close state, the rotation direction of the first component is the same as the rotation direction of the lever rotating along the side by using the dual axis rotating module as the pivot.

* * * * *